United States Patent
Kakimoto et al.

(10) Patent No.: US 7,982,420 B2
(45) Date of Patent: Jul. 19, 2011

(54) ENERGIZATION TIMING DETERMINATION CIRCUIT AND DETERMINATION METHOD FOR ENERGIZATION TIMING OF MOTOR

(75) Inventors: Noriyuki Kakimoto, Kariya (JP); Atsushi Kanamori, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 526 days.

(21) Appl. No.: 12/213,397

(22) Filed: Jun. 19, 2008

(65) Prior Publication Data

US 2009/0009116 A1    Jan. 8, 2009

(30) Foreign Application Priority Data

Jun. 20, 2007  (JP) ................. 2007-162535
Dec. 7, 2007   (JP) ................. 2007-316990

(51) Int. Cl.
*H02P 6/18* (2006.01)
(52) U.S. Cl. .......... 318/400.34; 318/400.13; 318/400.14
(58) Field of Classification Search ............. 318/400.34, 318/400.13, 400.14, 400.35, 400.11, 400.33, 318/400.03, 400.1
See application file for complete search history.

(56) References Cited

U.S. PATENT DOCUMENTS
2009/0009117 A1 *  1/2009  Someya et al. .......... 318/400.35

FOREIGN PATENT DOCUMENTS
JP   A-2000-245190   9/2000
JP   A-2004-297980   10/2004
JP   A-2006-158022   6/2006

OTHER PUBLICATIONS

Office Action dated Jun. 2, 2009 from the Japan Patent Office in the corresponding JP application No. 2007-316990 (and English Translation).

* cited by examiner

*Primary Examiner* — Karen Masih
(74) *Attorney, Agent, or Firm* — Posz Law Group, PLC

(57) ABSTRACT

An energization timing determination circuit corrects a shift contained in a position signal outputted from a position detecting means and supplies energization timing appropriate to drive a motor. A correction amount computation unit computes detection intervals obtained based on position signals outputted from filters, comparators, and a position detection unit during one cycle of electrical angle. The correction amount computation unit thereby determines the duty shift length α and phase shift length β of the position signals. A control circuit corrects energization timing based on the position signals according to the detected shift lengths.

20 Claims, 12 Drawing Sheets

ENERGIZATION TIMING DETERMINATION CIRCUIT AND DETERMINATION METHOD FOR ENERGIZATION TIMING OF MOTOR

CROSS REFERENCE TO RELATED APPLICATIONS

The present invention is based on and claims priority to Japanese Patent Application No. JP 2007-162535 filed on Jun. 20, 2007 and Japanese Patent Application No. JP 2007-316990 filed on Dec. 7, 2007.

BACKGROUND OF THE INVENTION

1. Field of the Invention

The present invention relates to a circuit for detecting a rotational position of a rotor and more specifically, for controlling the driving of a brushless direct-current (DC) motor. The present invention further relates to an energization timing determination circuit including the detecting circuit and to a determination method for the energization timing of a motor.

2. Description of Related Art

To control the driving of a brushless DC motor, multiple Hall elements or similar sensor elements are typically disposed at intervals of an angle of 60° or 120° on the stator side to detect the rotational position by way of the magnetic pole position of the rotor. Energization timing for stator coils is determined based on position signals from these elements. However, disadvantages arise in that when such a construction is adopted, a wiring for supplying power to the Hall elements and a wiring for obtaining detection output are required complicating the structure of the motor. In addition, Hall elements cannot be used in applications involving a high-temperature environment.

To cope with the above described and other disadvantages, a so-called sensorless drive system may be adopted. As described in JP-A-2006-158022, in such a sensorless drive system, a phase voltage produced in a stator coil is detected when a rotor is rotated. Rotor position information acquired from the phase voltage without the use of a sensor such as a Hall element.

FIG. 10 illustrates the general configuration of a system applied to a device for driving, for example, a vehicle fan motor mounted in a vehicle. A brushless DC motor 1 is driven through an inverter unit 2. The inverter unit 2 is constructed by connecting, for example, six power metal oxide semiconductor field effect transistors (MOSFET) 3a to 3f in a three-phase bridge configuration. The output terminals of the respective phases of the inverter unit 2 are respectively connected to the stator coils 4U, 4V, 4W of the respective phases of the motor 1.

The inverter unit 2 is controlled by a control unit 5 constructed of a microcomputer or a logic circuit, and the gate of each field effect transistor (FET) 3 has a driving signal outputted thereto through a gate driver circuit 6. The rotor rotational position of the motor 1 is detected by comparators 8 and a position detection unit 9 through low-pass filters 7 each constructed of a capacitor C and a resistor R, and a resulting position signal is supplied to a control circuit 10.

The input terminals of the low-pass filters 7U, 7V, 7W are connected to the output terminals of the respective phases of the inverter unit 2. The comparators 8U, 8V, 8W compare output signals of the low-pass filters 7U, 7V, 7W with a virtual neutral potential. The above construction excluding the motor 1 forms a motor driving device 11.

FIG. 11 illustrates voltage waveform at each part observed when the motor 1 is energized through the inverter unit 2. When the motor 1 is started, the control unit 5 energizes it in a predetermined pattern to start the motor 1. When the motor 1 starts to rotate, the induced voltages produced in the stator coils 4U, 4V, 4W appear as the terminal voltages of the coils 4 as shown in section (a. The terminal voltages of the coils 4 contain a harmonic component and a DC component. When the harmonic and DC components are removed through the low-pass filters 7, a substantially sinusoidal induced voltage waveform is obtained as shown in section (b. Then, the comparators 8 compare the output signals of the filters 7 with a virtual neutral potential and output rectangular-wave position signals of the respective phases as shown in section (c.

The control unit 5 sets a pulse width modulation (PWM) duty determining a rotational speed of the motor 1 according to a control signal supplied from an external electronic control unit (ECU), which for simplicity is not shown. At the same time, the control unit 5 determines commutation timing according to a position signal supplied from the position detection unit 9, and generates and outputs a driving signal to the gate driver circuit 6.

When a motor 1 is PWM controlled by a sensorless drive system, as mentioned above, an unwanted waveform component and noise contained in an induced phase voltage signal must be removed through a filter 7. As a result, a delay occurs in the phases of the induced voltage signal that passes through the filter 7. To make the phase delay substantially 90 degrees throughout the entire frequency range of the passed signal, a capacitance resistance (CR) time constant is increased to the extent that the attenuation of signals due to the filter 7 is permissible and a cut-off frequency is reduced.

It should be noted that since devices for driving a vehicle fan motor are typically installed in an engine compartment, the operating environmental temperature ranges vary widely. Further, due to tolerances of filters 7, CR time constants are susceptible to temperature resulting in considerable variation. Therefore, a high possibility exists that the time constant of each filter 7 of the respective phase will be shifted.

If there is an offset in a comparator 8 for comparing a signal that passes through a filter 7 with a virtual neutral potential, a discrepancy will be produced in position detection. A discrepancy is produced in the duty of a position signal by an offset. If there is variation in offset between three comparators 8U, 8V, 8W, the duty varies between three phases. If there is a discrepancy in position detection, energization timing varies and abnormal noise or degradation in efficiency due to torque ripples results.

The above problem pertains not only to sensorless drive systems. Also when a position sensor is used, energization timing will similarly vary with variation in the mounting location of each sensor.

SUMMARY OF THE INVENTION

The invention has been made in consideration of the foregoing. An object of the invention is to provide an energization timing determination circuit and a determination method for the energization timing of a motor wherein a shift contained in a position signal outputted from a position detecting means can be corrected to supply energization timing appropriate to drive a motor.

In an exemplary energization timing determination circuit, a detected shift length computing means computes a shift length based on a position signal switching interval obtained from position signals outputted from a position detecting means during at least the last one cycle. The detected shift length of the position signals is thereby determined. A correcting means corrects energization timing based on the position signals according to the detected shift length. The position detecting means is required to output a position signal in any one of a variety of ways. Therefore, the position detecting means can include position detection sensors, such as Hall elements, the position detection unit 9 used in sensorless driving illustrated in FIG. 10, or other constructions as would be apparent. The above correction makes it possible to determine appropriate energization timing according to the rotational state of the motor. When the motor is driven with the determined energization timing, it is possible to reduce torque ripples to enhance the driving efficiency of the motor and further suppress abnormal noise.

A detected shift length computing means measures the high-level time and the low-level time in the above one cycle with respect to each position signal outputted from a position detecting means. A duty shift length of the position signal is computed based on the difference value obtained by subtracting the low-level time from the high-level time. In general, position signals of the respective phases show a 50% duty without a duty shift. With a duty shift, the above balance is broken down and a magnitude relation is produced between the high-level period and the low-level period. Therefore, a duty shift length can be computed between the difference value between a high-level time and a low-level time.

A detected shift length computing means computes a phase shift length based on the relation between the switching intervals of position signals, a duty shift length, the phase shift length of the position signals, and the average value of the switching intervals of the position signals. When a corresponding duty shift length is corrected with respect to the switching interval of each position signal during one cycle of electrical angle, the phase shift length of the position signal between individual phases is left. When correction is carried out based on the phase shift length, therefore, the above switching interval becomes equal to the average value in one cycle. When the total value of the phase shift lengths in the respective phases is assumed to be "zero," the phase shift lengths can be determined by solving simultaneous equations derived from these relations. As a result, a phase shift length can be expressed as a function of the above switching intervals and the average value of the intervals. Therefore, both a duty shift length and a phase shift length can be determined by measuring the switching intervals of the individual position signals in one cycle.

A detected shift length computing means further detects an amount of change in the rotational speed of a motor and determines a detected shift length based on the amount of change in rotational speed and a position signal switching time acquired in the past. When the rotational speed of a motor is varying, the position signal switching intervals do not become equal because of change in number of revolutions as well as variation in detection. The switching interval of a position signal varies in one cycle. Therefore, the detected shift length can be precisely determined by taking an amount of change in the speed of the motor into account when determining a detected shift length even during a period for which the motor is being accelerated or decelerated.

A detected shift length computing means further detects the rotational speed of a motor and excludes a portion arising from acceleration/deceleration of motor rotational speed of factors accounting for inequality of position signal switching timing by computation based on the amount of change in rotational speed and thereby computes variation in the position detection signal due to the remaining detected shift length. Therefore, a detected shift length can be precisely determined even during a period for which the motor is being accelerated or decelerated.

A detected shift length computing means further expands or contracts a time axis on which computation is based, based on an amount of change in rotational speed and places a position signal switching time already acquired on the time axis making it possible to assume a constant speed state even when the speed of a motor varies. When a detected shift length is determined from a position signal switching interval obtained from the switching time, energization timing in actual time can be determined by correcting energization timing on the expanded or contracted time axis and transforming the result of the correction back into the original time axis.

In an exemplary energization timing determination circuit, detected shift lengths that are determined by a detected shift length computing means are stored in a storing means. When a detected shift length is stored in the storing means, a correcting means reads the detected shift length to correct energization timing. Therefore, the detected shift length computing means need not frequently carry out computation to determine a detected shift length, and a processing load can be reduced. A detected shift length computing means further determines a detected shift length at predetermined intervals and stores the detected shift length in a storing means. Therefore, a detected shift length used for correction can be updated at predetermined intervals. A detected shift length computing means further determines a detected shift length when a condition change determining means determines that the drive condition or ambient environment of a motor has changed, and stores the detected shift length in a storing means. Therefore, a detected shift length can be updated according to change in the drive condition or change in the ambient environment of the motor.

A detected shift length computed by a detected shift length computing means according to a drive condition or an ambient environment is stored beforehand in a storing means. A correcting means reads a detected shift length corresponding to the drive condition or ambient environment of a motor from the storing means to carry out correction. Therefore, it is unnecessary to carry out computation to determine a detected shift length while driving of a motor is being controlled, and processing required for correction can be reduced.

In an exemplary energization timing determination circuit, a condition change determining means determines that a condition has changed when the ambient temperature of a motor, the number of revolutions of the motor, or an externally supplied control signal for the motor fluctuates beyond a predetermined value. Therefore, the detected shift length computing means can compute and update a detected shift length when each concrete condition is changed.

DETAILED DESCRIPTION OF THE PREFERRED EMBODIMENTS

First Embodiment

Figure 10:
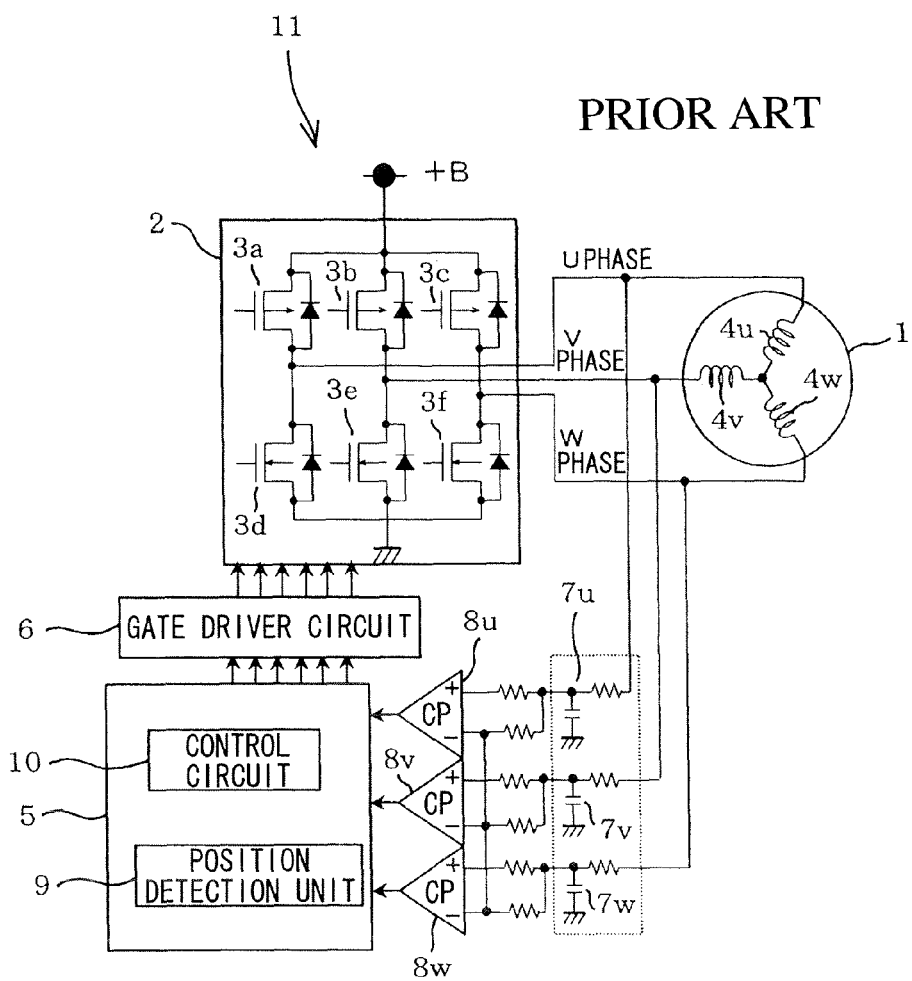
FIG. 10 is a diagram illustrating an exemplary configuration of a motor driving device in accordance with related art.
Figure 11:
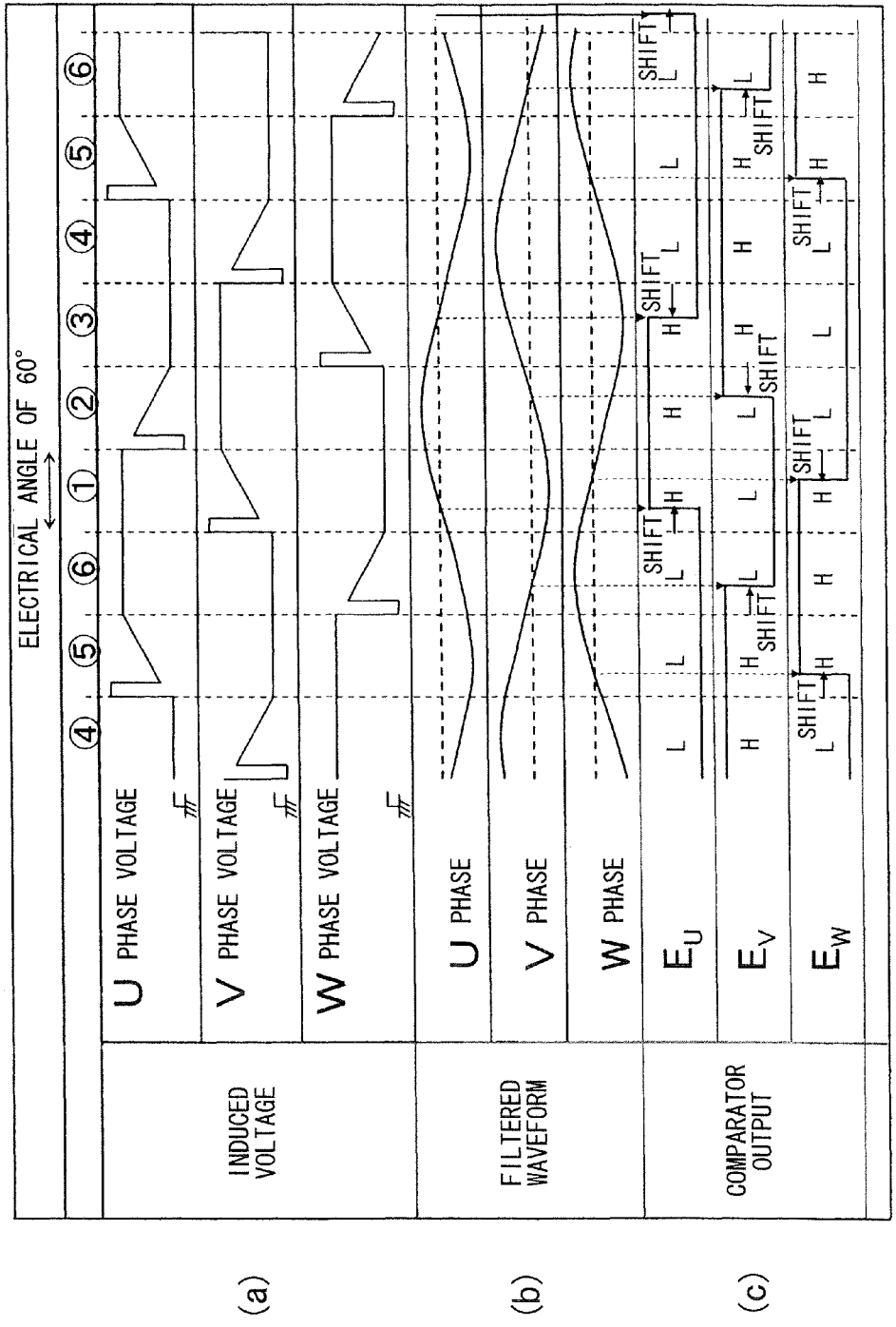
FIG. 11 is a diagram illustrating the voltage waveform observed at each part when a motor is energized.

Hereafter, description will be given to a first embodiment of the invention with reference to the drawings from FIG. 1 to FIG. 4. The same members as in FIG. 10 will be marked with the same reference numerals, and the description of them will be omitted. Hereafter, description will be given to a difference. The configuration of a motor driving device 21 in this embodiment is such that the control unit 5 of the driving device 11 in FIG. 10 is replaced with a control unit 22. The control unit 22, which can operate as an energization timing determination circuit, includes a position detection unit 23, which can function as a position detecting means, a control circuit 24, which can function as a correcting means, a correction amount computation unit 25, which can function as a detected shift length computing means, and a storage unit 26 in place of a position detection unit 9 and a control circuit 10.

The correction amount computation unit 25 is a functional portion used to compute an amount of correction for an energization timing signal outputted from the position detection unit 23. The storage unit 26 is used to store data pertaining to the process and result of this computation. The correction amount computation unit 25 measures the switching interval of position signals outputted from comparators 8U, 8V, 8W, acting as position detecting means, through the position detection unit 23 and carries out computation based on the result of the measurement.

Description will be given to the action of the present embodiment with reference to the drawings from, for example, FIG. 2A to FIG. 4C. First, description will be given to the principle of detection of the length of a shift contained in a position signal. When a motor 1 is being rotated at constant speed, position signals of the respective phases are ideally outputted as rectangular waves of 50% duty. The above "shift" includes a "duty shift" in which the duty of signals of each phase increases or decreases from 50% and a "phase shift" in which the phase relation between position signals is shifted from phase to phase. Each of the U-, V-, and W-phases can shift independently of each other according to, for example, deviation in values from a standard value in a variety of circuit elements.

Figure 1:
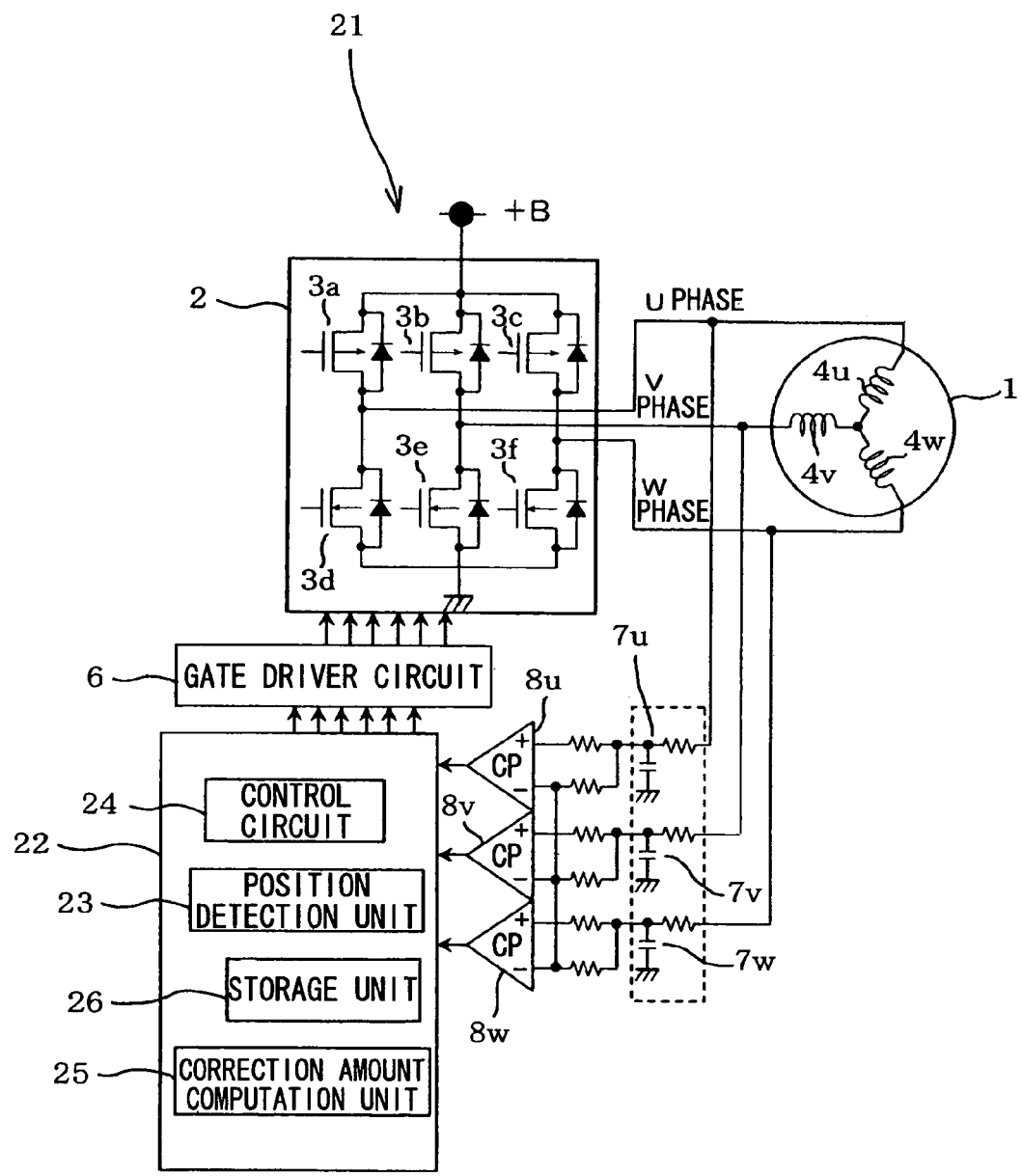
FIG. 1 is a diagram illustrating an exemplary configuration of a motor driving device in a first embodiment.
Figure 2A:
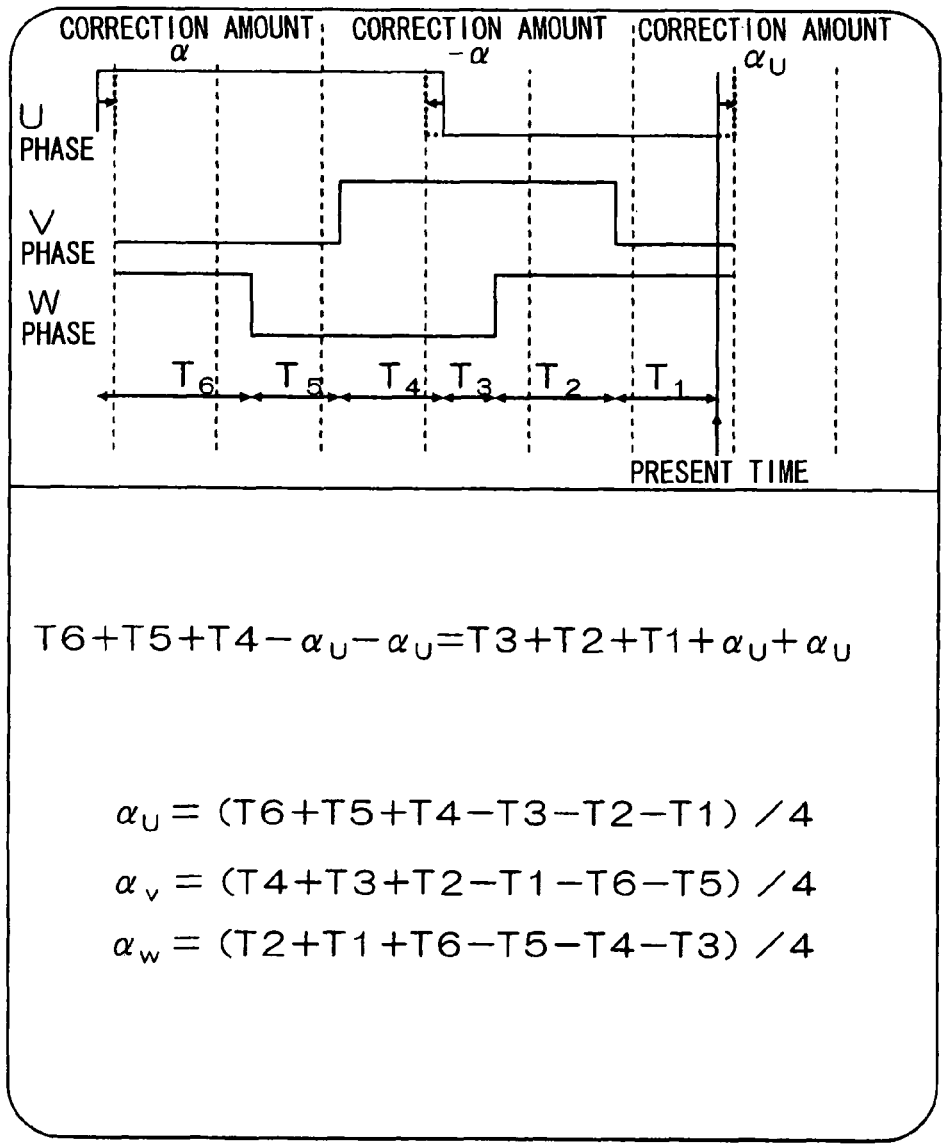
FIG. 2A is a diagram illustrating an exemplary duty shift occurring in position signals of U, V, and W phases.

FIG. 2A illustrates an example in which a duty shift has occurred in position signals of U, V, and W phases. The pattern of occurrence of actual shifts is any combination of a case where high-level duty exceeds 50% with respect to each phase and a case where it falls below 50%. To detect a duty shift length, a state in which the high-level duty is over 50% like the U-phase signal illustrated in FIG. 2A with respect to all the position signals is assumed.

The position detection unit 23 supplies the correction amount computation unit 25 with a result of measurement of switching intervals T6 to T1 of the position signals, ideally equivalent to an electrical angle of 60 degrees. With respect to one cycle of electrical angle, it will be assumed that the switching intervals T6 to T4 correspond to a high-level period of the U-phase signal and the switching intervals T3 to T1 correspond to a low-level period of the U-phase signal as can be expressed by Equation 1 as follows:

$$T6+T5+T4-2^*\alpha_U = T3+T2+T1+2^*\alpha_U \quad (1)$$

Where $\alpha_U$ is the duty shift length of the U-phase signal. Equation 1 shows that the value corrected by subtracting the shift length $\alpha_U$ from a high-level pulse width and the value corrected by adding the shift length $\alpha_U$ to a low-level pulse width are equal to each other.

When Equation 1 is solved to determine the duty shift length au, Equation 2 is obtained:

$$\alpha_U = (T6+T5+T4-T3-T2-T1)/4 \quad (2)$$

Also, with respect to V phase and W phase, the duty shift lengths $\alpha_V$ and $\alpha_W$ can be similarly obtained from Equation 3 and Equation 4 as follows:

$$\alpha_V = (T4+T3+T2-T1-T6-T5)/4 \quad (3)$$

$$\alpha_W = (T2+T1+T6-T5-T4-T3)/4 \quad (4)$$

Figure 2B:
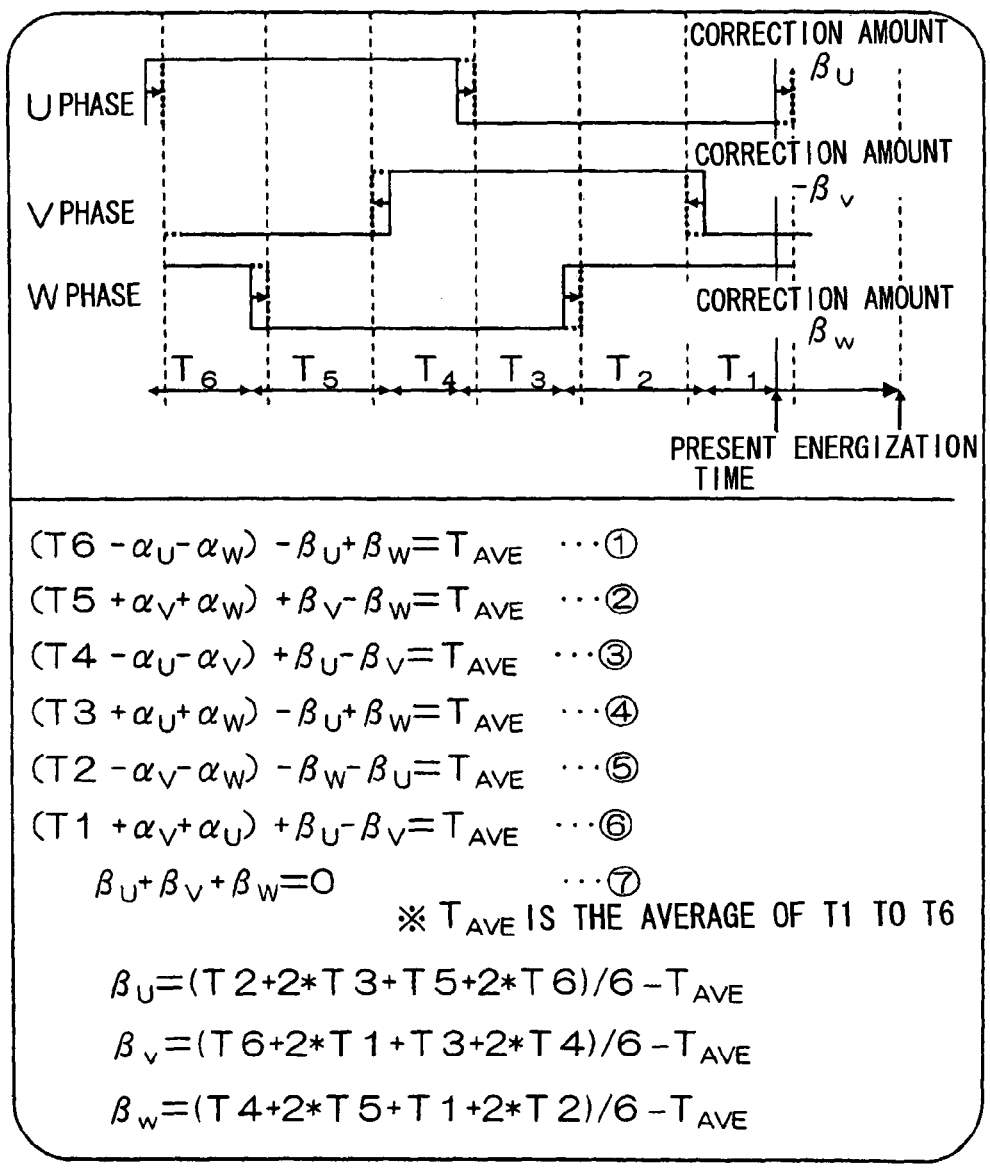
FIG. 2B is a diagram illustrating an exemplary phase shift occurring between signals of U, V, and W phases.

FIG. 2B illustrates an example of a state in which a phase shift has occurred between signals of U, V, and W phases, the pattern of occurrence of actual shifts being in any combination. To detect a phase shift length, therefore, a state in which a phase shift has occurred on the advance side, such as the U-phase signal illustrated in FIG. 2B, with respect to all the position signals is assumed. Under such circumstances, Equations 5-10 can be used with respect to each of the switching intervals T6 to T1:

$$(T6-\alpha_U-\alpha_W)-\beta_U+\beta_W = T_{AVE} \quad (5)$$

$$(T5+\alpha_V+\alpha_W)+\beta_V-\beta_W = T_{AVE} \quad (6)$$

$$(T4-\alpha_U-\alpha_V)+\beta_U-\beta_V = T_{AVE} \quad (7)$$

$$(T3+\alpha_U+\alpha_W)-\beta_U+\beta_W = T_{AVE} \quad (8)$$

$$(T2-\alpha_V-\alpha_W)-\beta_W-\beta_U = T_{AVE} \quad (9)$$

$$(T1+\alpha_V+\alpha_U)+\beta_U-\beta_V = T_{AVE} \quad (10)$$

where, $\beta_U$, $\beta_V$, and $\beta_W$ are phase shift lengths of the respective phases and $T_{AVE}$ is the average value of the switching intervals T6 to T1.

The left side terms in parentheses in Equations (5) to (10) indicate the results obtained by correcting a duty shift. That is, the results obtained by correcting a duty shift and a phase shift with respect to the individual switching intervals T6 to T1 are all equal to the average value $T_{AVE}$. It is assumed that the total of the phase shift lengths $\beta_U$, $\beta_V$, and $\beta_W$ of the respective phases becomes equal to "0" as shown in Equation 11.

$$\beta_U+\beta_V+\beta_W = 0 \quad (11)$$

When the phase shift lengths $\beta_U$, $\beta_V$, and $\beta_W$ are determined by Equations 5 to 11, the equations 12-14 are obtained:

$$\beta_U = (T2 + 2*T3 + T5 + 2*T6)/6 - T_{AVE} \quad (12)$$

$$\beta_V = (T6 + 2*T1 + T3 + 2*T4)/6 - T_{AVE} \quad (13)$$

$$\beta_W = (T4 + 2*T5 + T1 + 2*T2)/6 - T_{AVE} \quad (14)$$

The duty shift length $\alpha$ and the phase shift length $\beta$ are determined based on the above principles, and energization timing is corrected. The signs of the shift lengths $\alpha$ and $\beta$ set when the above equations are written are interim signs. In the results of computation of Equations 2 to 4 and 12 to 14, therefore, the signs of $\alpha$ and $\beta$ are determined according to the state of a shift that has actually occurred.

Figure 3:
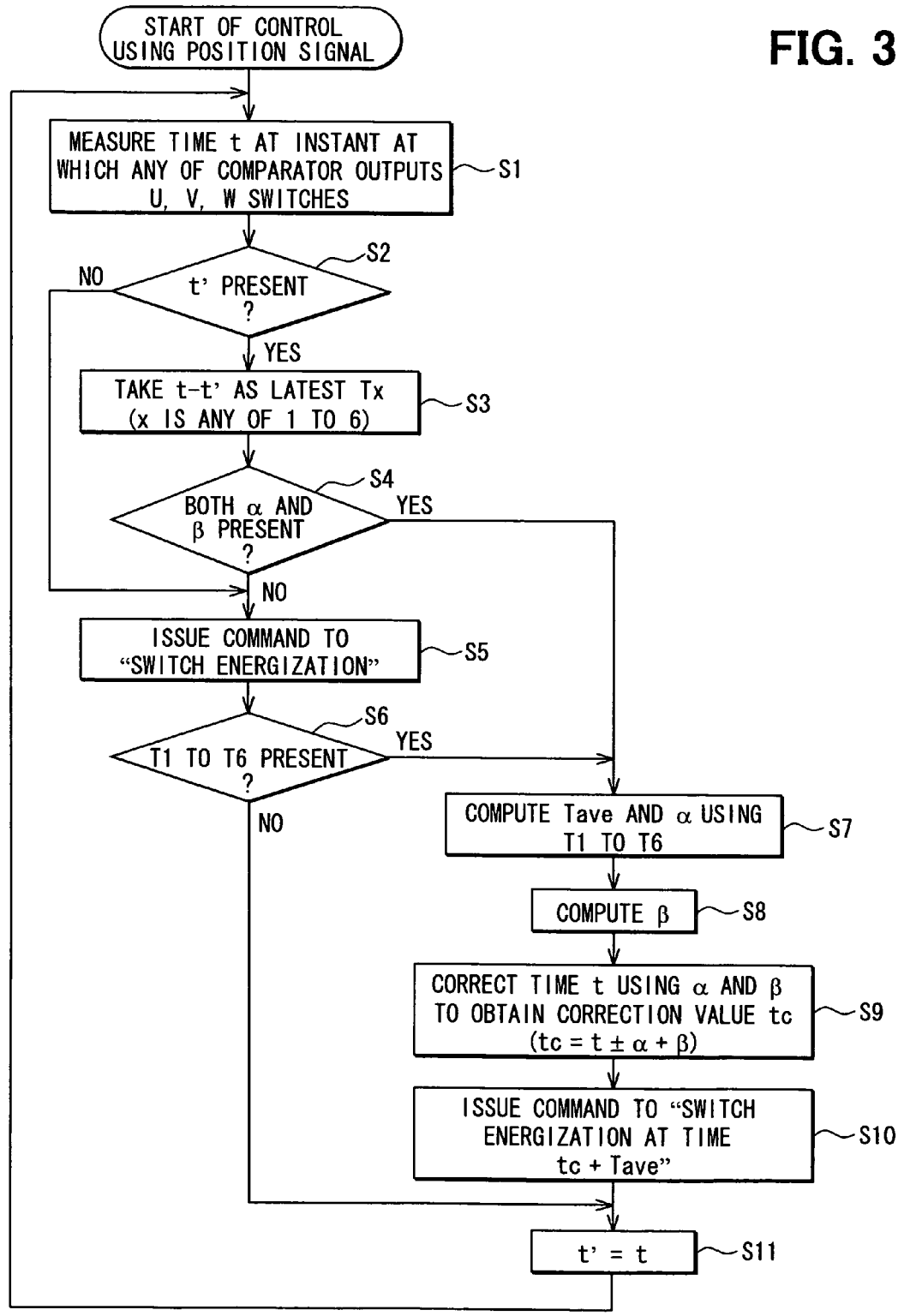
FIG. 3 is a flowchart illustrating an exemplary processing flow carried out by a control unit.
Figure 4:
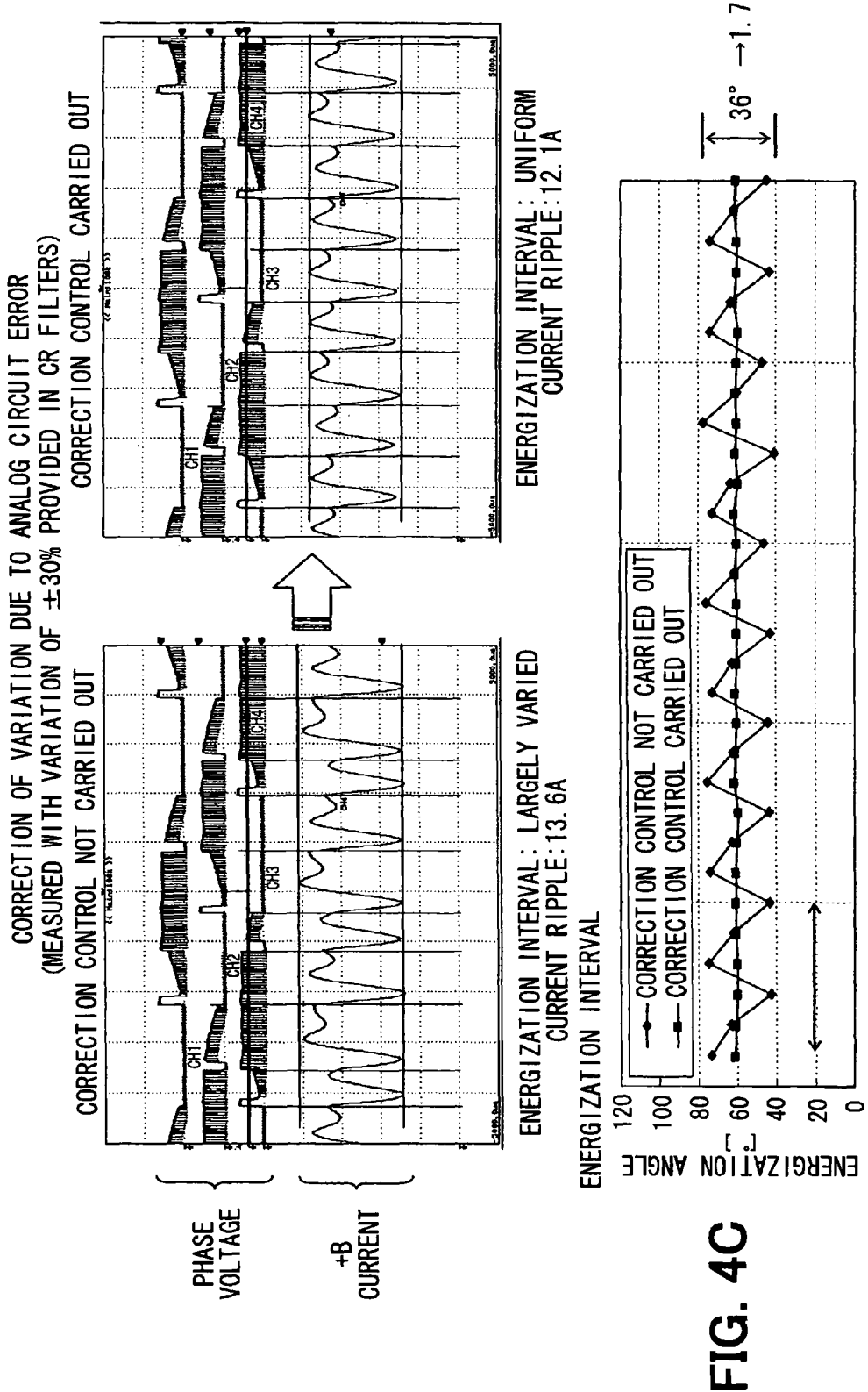
FIG. 4A is a diagram illustrating an experimental result in which phase voltage waveform and power current waveform are observed with a time constant varied from filter to filter.
FIG. 4B is a diagram illustrating an experimental result in which phase voltage waveform and power current waveform were observed with a time constant varied from filter to filter.
FIG. 4C is a diagram illustrating a magnitude of variation in an energization angle within one cycle of electrical angle with respect to exemplary cases illustrated in FIG. 4A and FIG. 4B.

FIG. 3 is a flowchart illustrating the flow of energization timing correction processing carried out by the control unit 22. The position detection unit 23 measures the time t at the instant at which the output signal level of any of the comparators 8U, 8V, 8W switches between high and low at S1. The correction amount computation unit 25 determines whether the time t' measured at the previous time is present at S2. When the time t' measured at the previous time is not present corresponding to NO at S2, a command for switching the energization of the motor 1 is outputted control at S5 by, for example, the same control as conventional sensorless system.

Then, it is determined whether the measurement results T1 to T6 equivalent to one cycle of electrical angle have been already present at S6. If not, corresponding to NO at S6, the result t of measurement at this time is taken as t' at S11, and the flow returns to S1. The correction processing of the invention cannot be carried out unless switching intervals measured with respect to at least one cycle of electrical angle are acquired. Therefore, the motor 1 is driven by conventional sensorless control until measurements are acquired.

When the previously measured time t' is present, corresponding to YES at S2, the correction amount computation unit 25 computes the difference t-t' between a time measurement result t and the previously measured time t'. The obtained result is taken as the latest Tx, with x being any of 1 to 6, at S3. Subsequently, it is determined whether both the shift lengths $\alpha$ and $\beta$ have been already computed. When both have not been determined, corresponding to NO at S4, correction cannot be carried out and flow proceeds to S5. When an affirmative determination is made, corresponding to YES at S4 or S6, the average value $T_{AVE}$ of the switching intervals T1 to T6 and the duty shift length $\alpha$ are computed using the switching intervals at S7. Subsequently, the phase shift length $\beta$ is computed at S8.

Then, the control circuit 24 adds the shift lengths $\alpha$ and $\beta$ determined at S7 and S8 to the value t measured at S1 to obtain a correction value tc at S9 in accordance with Equation 15.

$$tc = t \pm \alpha + \beta \quad (15)$$

The value t can be defined as time at the instant at which the output signal level of any of the comparators 8U, 8V, 8W switches between high and low.

Then, the control circuit 24 determines that the time obtained by adding the average value $T_{AVE}$ to the correction value tc is taken as the next occurrence of energization timing, and outputs an energization switching command at S10. When t corresponds to a rising edge of the U-phase signal, that is, when switching between T1 and T6, the shift lengths $\alpha$ and $\beta$ in Equation 15 are $\alpha_U$ and $\beta_U$. In case of rising edge, the sign prefixed to $\alpha$ in Equation 15 is +. Thereafter, the flow proceeds to S11.

FIG. 4A to FIG. 4C illustrate exemplary experimental results. FIG. 4A and FIG. 4B illustrate the results obtained by observing the phase voltage waveform and the power current waveform when a variation of ±30% was provided in the time constants of the filters 7 functioning as position detecting means. FIG. 4C illustrates the magnitude of variation in energization angle within one cycle of electrical angle with respect to both the cases illustrated in FIG. 4A and FIG. 4B.

FIG. 4A illustrates the result obtained when correction control of the invention was not carried out. The variation in energization angle is as large as 36 degrees, and the current ripple is 13.6 A. FIG. 4B illustrates the result obtained when correction control of the invention was carried out. The variation in energization angle is reduced to 1.7 degrees, and the current ripple is also reduced down to 12.1 A in conjunction therewith.

According to the present embodiment, as previously described, the correction amount computation unit 25 of the control unit 22 carries out computation based on position signal switching intervals outputted from the comparators 8 and the position detection unit 23 through the filters 7 during one cycle of electrical angle. The correction amount computation unit thereby determines a detected shift length of the position signals. The control circuit 24 corrects energization timing based on position signals according to the detected shift length. Therefore, energization timing can be corrected even when a shift is contained in position signals due to variation in CR time constant between filters 7 or the like. Accordingly, it is thereby possible to reduce torque ripples and enhance efficiency and suppress the production of abnormal noise by driving the motor 1 through the inverter unit 2 with the corrected and appropriate energization timing.

The correction amount computation unit 25 measures the interval immediately before the signal level transitions between high and low, that is, the position signal switching interval with respect to the position signal of each phase. The correction amount computation unit 25 can then appropriately determine the duty shift length $\alpha$ based on the difference value between a time for which each position signal is at the high level within one cycle of electrical angle and a time for which each position signal is at the low level using for example, Equations 2 to 4, by computation based on the action principle of the shift length $\alpha$.

Further, the correction amount computation unit 25 computes the phase shift length $\beta$ based on the relation between the switching intervals T1 to T6, the duty shift length $\alpha$, the phase shift length $\beta$ of position signals, and the average value of the switching intervals according to, for example, Equations 12 to 15. Therefore, both the duty shift length $\alpha$ and the phase shift length $\beta$ can be determined by measuring each of the switching intervals T1 to T6 in one cycle.

Second Embodiment

Figure 5:
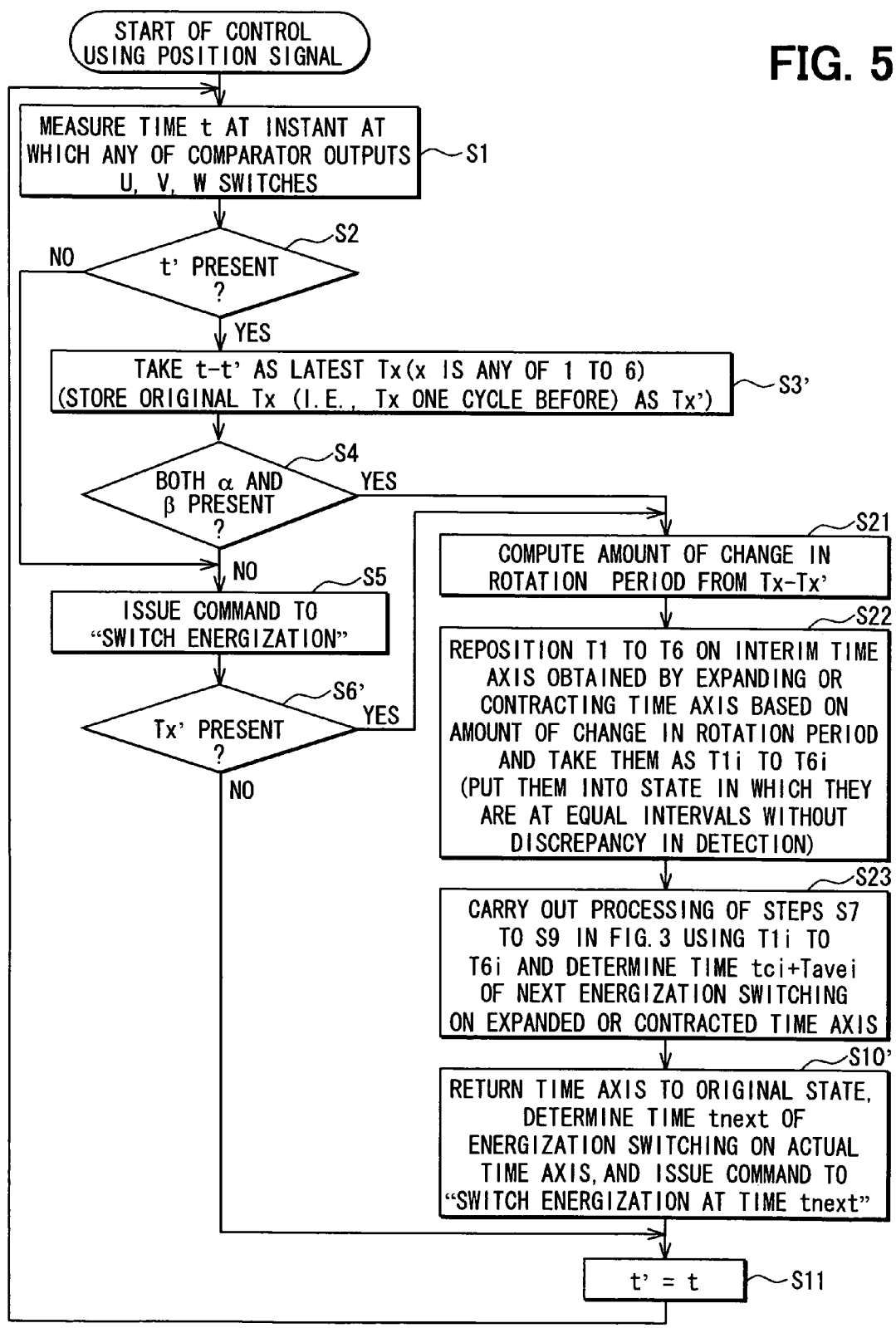
FIG. 5 is a flowchart illustrating an exemplary processing flow carried out by a control unit in a second embodiment.

FIG. 5 illustrates a second embodiment of the invention. The description of elements in common with the first embodiment that are marked with the same reference numerals is omitted for simplicity. Hereafter, description will be focused on the differences between the first and second embodiments. The construction of the second embodiment is basically the same as that of the first embodiment, except the details of processing carried out by the control unit 22. In the first embodiment, the motor 1 is assumed to be running at a constant speed, while in the second embodiments correction is carried out with the motor 1 assumed to be accelerated or decelerated.

The processing of S3 at which the latest Tx is stored in the flow illustrated in FIG. 3 is replaced with the processing in which the latest Tx is stored and at the same time, the original Tx, that is, Tx one cycle before is stored as Tx' at S3'. At S6 in the first embodiment, it is determined whether data sufficient to compute a correction value has been accumulated after the control of the invention was started. In the second embodiment, S6 is replaced with S6' at which it is determined whether there is Tx' required to determine an amount of change in rotation period in addition to repositioning of T1 to T6. When Tx' is present in the second embodiment, T1 to T6 must be naturally present.

When it is determined that the amount of change in rotation period can be computed, the amount of change is computed at S21. Using the computed amount of change, an interim time axis is set. The interim time axis is obtained by expanding or contracting the time axis so that the motor can be considered to be rotating at constant speed. T1 to T6 are repositioned on the interim time axis and they are taken as T1$i$ to T6$i$ at S22. In case of acceleration operation, for example, the time axis is contracted. Therefore, it is expanded to produce the same state as constant-speed operation. On the interim time axis, fluctuation in position detection signal switching based on acceleration or deceleration of the motor is removed with respect to T1$i$ to T6$i$. Therefore, the processing flow illustrated in FIG. 3 of S7 to S9 is carried out on the interim time axis, and the time tci+$T_{AVE}$i of the next energization switching on the interim time axis is determined at S23. Thereafter, the time tnext of the next energization switching on the actual time axis is determined from tci+$T_{AVE}$i, and a command to "switch energization at the time tnext" is issued at S10'. In a case of constant-speed operation, the amount of change in rotation period at S21 is "0." As the result, the processing is carried out as in the first embodiment.

According to the second embodiment, as previously described, the correction amount computation unit 25 further detects an amount of change in the rotation period of the motor 1, and determines the detected shift lengths $\alpha$ and $\beta$ based on the amount of change in rotation period and a position signal switching time t. Therefore, the detected shift lengths can be precisely determined even when the motor 1 is being accelerated or decelerated. Specifically, the time axis on which computation is based is expanded or contracted based on an amount of change in speed, and the position signal switching times already acquired are placed on the time axis. The detected shift lengths $\alpha$ and $\beta$ are determined from the position signal switching intervals obtained from these switching times. Energization timing is corrected on the expanded or contracted time axis, and the result of the correction is transformed back into the original time axis. Thus, energization timing in terms of actual time can be determined.

In the present embodiment, the time axis is expanded or contracted based on an amount of change in rotation period obtained from position signal switching intervals in the past. Thus, processing is carried out as if the motor were rotating at constant speed to determine a correction amount. An embodiment in which a duty ratio at the time of determining $\alpha$ is expanded or reduced corresponding to an amount of change in rotation period is possible. Further, an embodiment in which a phase shift at the time of determining $\beta$ is similarly expanded or reduced is possible. Such embodiments would be essentially identical with the above described embodiment.

Third Embodiment

Figure 6:
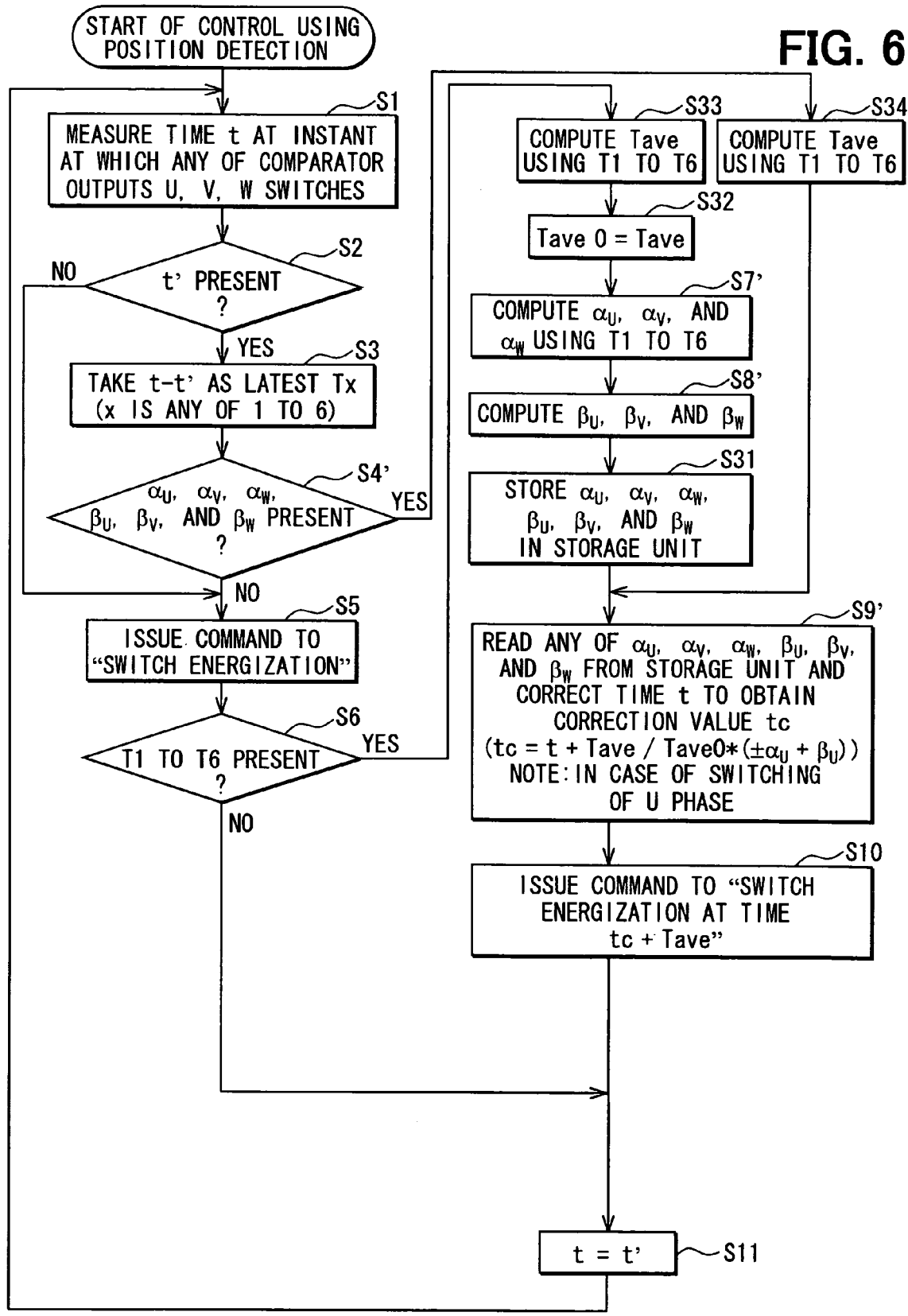
FIG. 6 is a flowchart illustrating an exemplary processing flow carried out by a control unit in accordance with a third embodiment.

FIG. 6 illustrates a third embodiment of the invention. Description will be focused on the differences from the first embodiment. The series of processing shown in FIG. 6 is described as follows. When an affirmative determination that the switching signals equivalent to one cycle of electrical angle have been acquired, corresponding to YES at S6, $T_{AVE}$ is determined at S33 and $T_{AVE}0$ is set to $T_{AVE}$ at S32. The control circuit 24 further determines the duty shift length $\alpha$ and the phase shift length $\beta$ at S7' and S8' and stores the values $\alpha_U, \alpha_V, \alpha_W, \beta_U, \beta_V$, and $\beta_W$ in the storage unit 26, which can function as a storing means, at S31. Thereafter, processing proceeds to S9'. In the first embodiment, only the latest duty shift length $\alpha$ and phase shift length $\beta$, such as any of U, V, and W, to be corrected are determined. In the third embodiment, instead, $\alpha_U, \alpha_V, \alpha_W, \beta_U, \beta_V$, and $\beta_W$ are computed at a time and stored at S31. Since the correction value is in proportion to the cycle of electrical angle, $T_{AVE}$ obtained when $\alpha$ and $\beta$ are determined is also stored as $T_{AVE}0$ at S32.

When it is determined that $\alpha_U, \alpha_V, \alpha_W, \beta_U, \beta_V$, and $\beta_W$ are present corresponding to YES at S4, the control circuit 24 carries out correction. The duty shift length $\alpha$ and the phase shift length $\beta$ of any of U, V, and W corresponding to the switching signal to be corrected, stored in the storage unit 26 are used. Since the correction amounts $\alpha$ and $\beta$ are in proportion to $T_{AVE}$, they are multiplied by $T_{AVE}/T_{AVE}0$ when they are used. For multiplication purposes, $T_{AVE}$ is determined each time at S33, S34 with the computation of S9' carried out based on the duty shift lengths $\alpha$ and phase shift lengths $\beta$ stored in the storage unit 26.

According to the third embodiment, as previously described, the duty shift length $\alpha$ and phase shift length $\beta$ computed by the correction amount computation unit 25 are stored in the storage unit 26. With the shift lengths $\alpha$ and $\beta$ stored in the storage unit 26, the control circuit 24 reads them out to correct energization timing. Therefore, the correction amount computation unit 25 need not frequently carry out computation to determine a detected shift length, and a processing load can be reduced.

Fourth Embodiment

Figure 7:
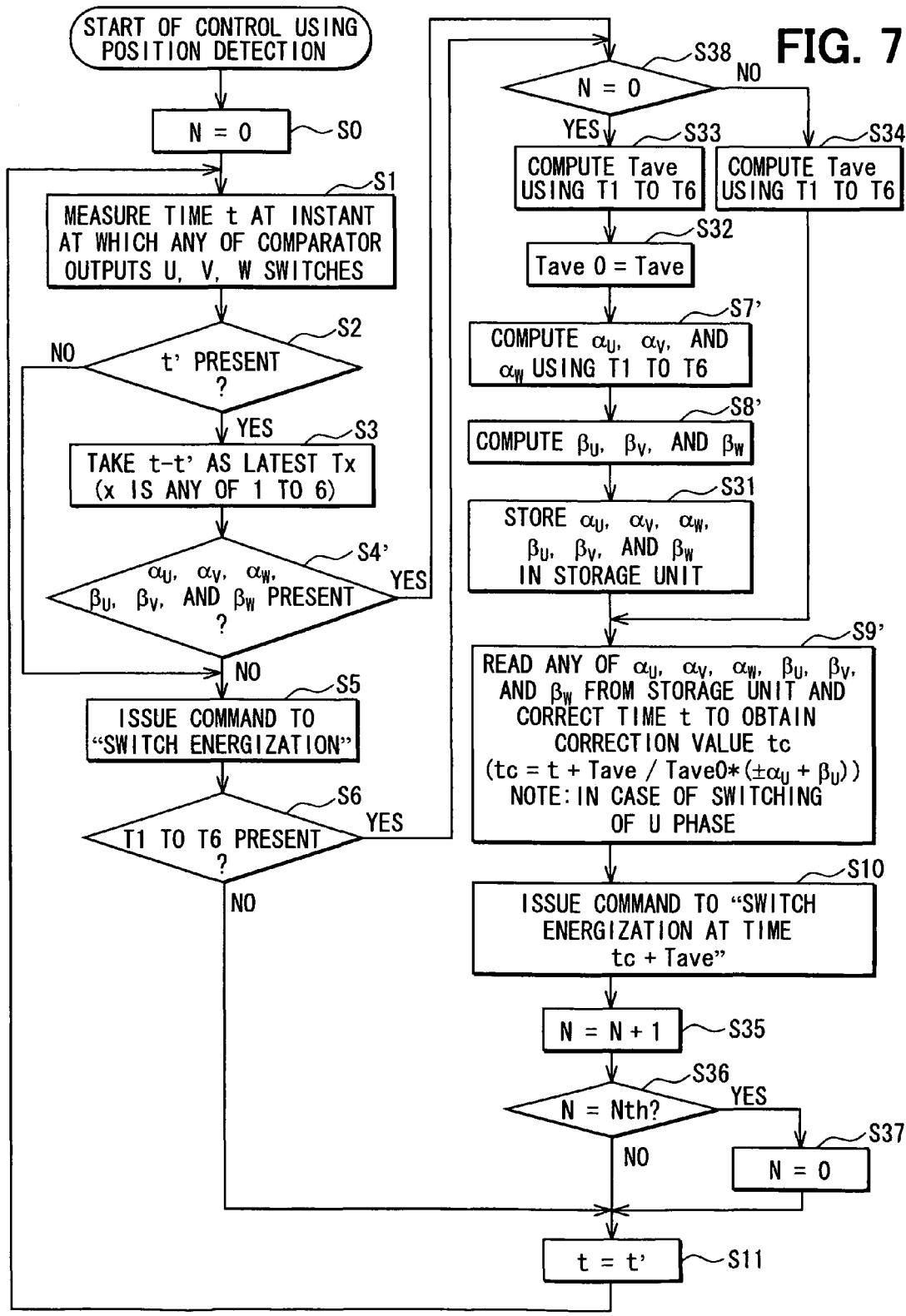
FIG. 7 is a flowchart illustrating an exemplary processing flow carried out by a control unit in accordance with a fourth embodiment of the invention.

FIG. 7 illustrates a fourth embodiment of the invention. Description will be focused on the differences from the third embodiment. In the flowchart illustrated in FIG. 7, the control circuit 24 carries out the processing of S10 and thereafter increments the value N of a counter for counting the number of times of energization timing correction at S35. It should be noted that the counter is cleared to zero as the result of initialization at S0. It is determined whether the value N of the counter has reached a predetermined value Nth at S36. When it is determined that N<Nth, corresponding to NO at S36, the flow proceeds to S11. The predetermined value Nth is set to, for example, a value equivalent to several cycles of electrical angle. When the flow in FIG. 7 is repeatedly carried out and it is eventually determined that N=Nth corresponding to YES at S36, the value N of the counter is cleared at S37. When N=0, corresponding to YES at S38, the correction amounts $\alpha$ and $\beta$ are computed again and updated.

According to the fourth embodiment, as previously described, the correction amount computation unit 25 determines the detected shift lengths $\alpha$ and $\beta$ at predetermined intervals and stores them in the storage unit 26. Therefore, the detected shift lengths used for correction can be updated at predetermined intervals.

Fifth Embodiment

Figure 8:
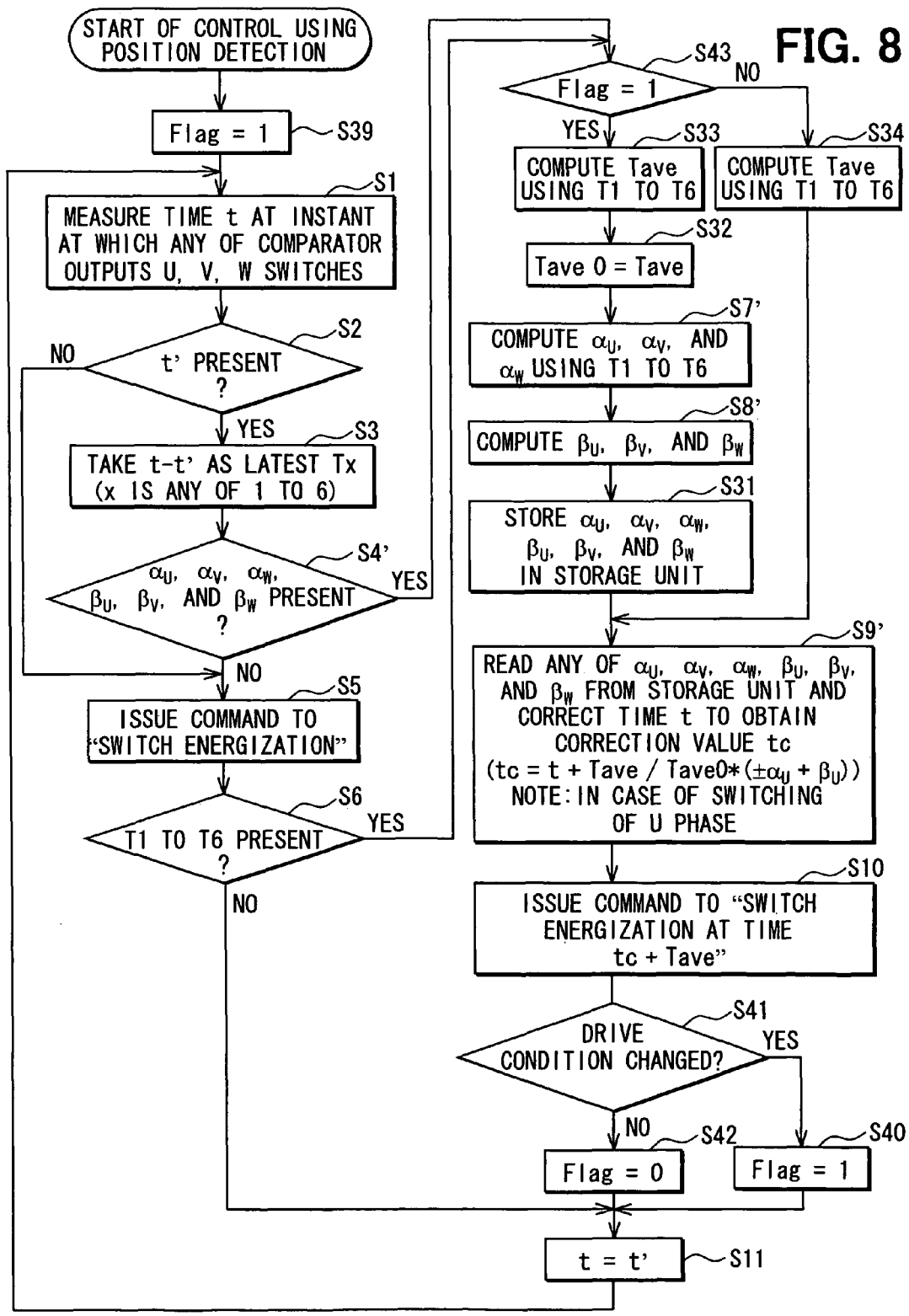
FIG. 8 is a flowchart illustrating an exemplary processing flow carried out by a control unit in accordance with a fifth embodiment of the invention.
Figure 9:
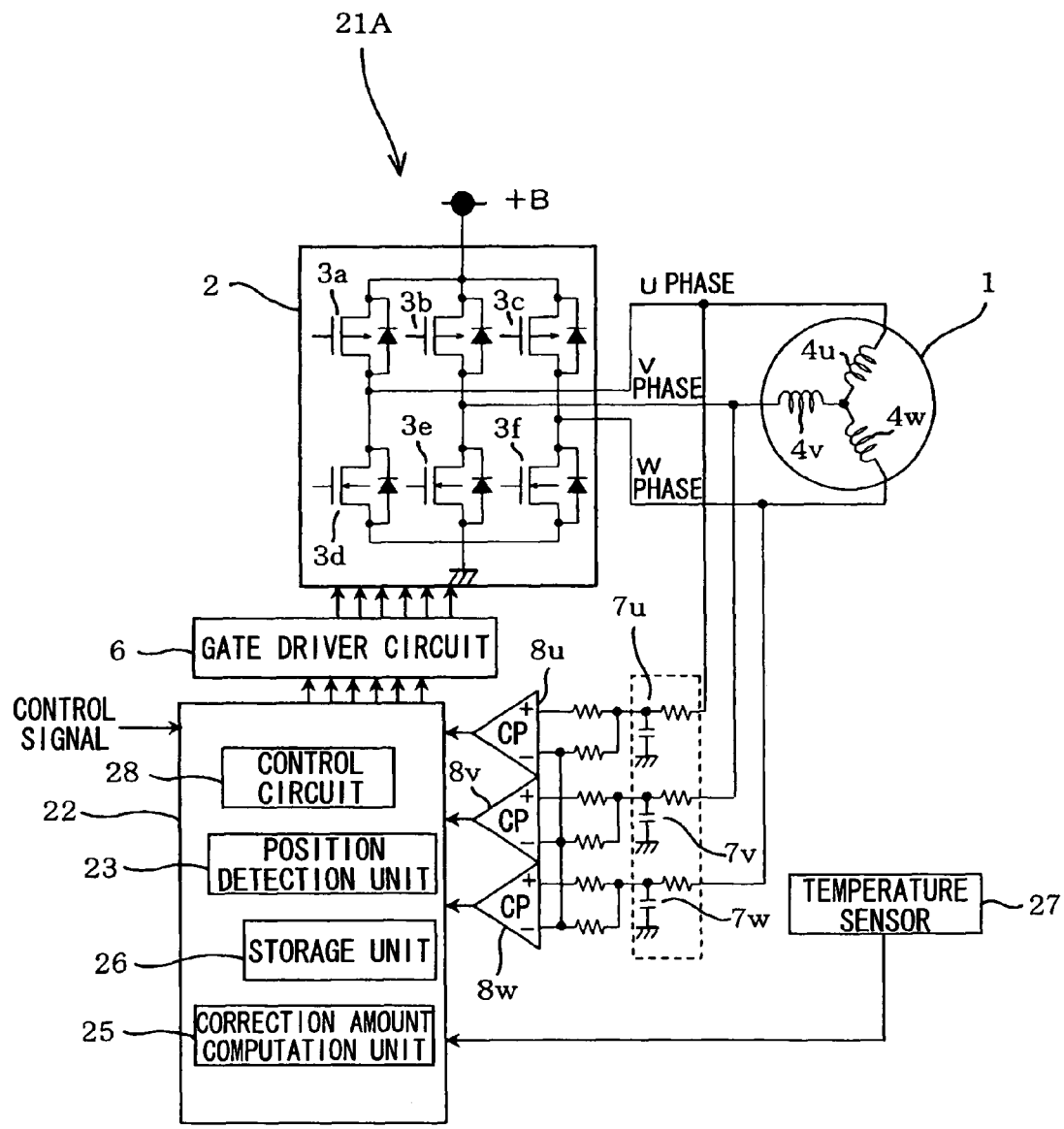
FIG. 9 is a diagram illustrating an exemplary configuration of a motor driving device.

FIG. 8 and FIG. 9 illustrate a fifth embodiment of the invention. Description will be focused on the differences from the fourth embodiment. In the fifth embodiment, a flag is prepared in place of N in the fourth embodiment. When there is not a correction value α or β in the initial state or when a drive condition or an ambient environment largely changes, the flag is set to 1 at S39 and S40. It should be noted that, in contrast to S38, which determines change based on the counter N, in S43 change is determined based on the flag.

When the processing of S10 is carried out, the control circuit 28, which can function as the condition change determining means, in the motor driving device 21A illustrated in FIG. 9 determines whether the drive condition or ambient environment of the motor 1 has changed at S41. When there is no change in drive condition, corresponding to NO at S41, the flow proceeds to S42 and the flag is set to 0. When there is change in drive condition, corresponding to YES at S41, the processing of S40 is carried out to set the flag to 1. When the flag is set to 1, α and β are updated by the same procedure as α and β are updated when N=Nth in the fourth embodiment. When the drive condition or ambient environment of the motor constantly changes, the flag is constantly set to 1 and the flow of processing is identical with the flow in the first embodiment.

Examples of cases where the drive condition or the ambient environment has changed, as is determined, for example, at S41, include the following cases. A change condition is determined when a temperature sensor 27, which can function as a temperature detecting means, for detecting the ambient temperature is disposed in proximity to the motor 1 or in the control unit as illustrated in FIG. 9 and the temperature detected by the temperature sensor 27 fluctuates beyond a predetermined value. A change condition is determined when the number of revolutions of the motor 1 fluctuates beyond a predetermined value. The number of revolutions can be detected through change in output signals from the comparators 8, which can function as the number of revolutions detecting means. A change condition is determined when a control signal for the motor 1, supplied from an ECU (not shown) fluctuates beyond a predetermined value.

When any of the above cases occurs, it is determined that the drive condition or ambient environment of the motor 1 has changed. With respect to the first case, when the ambient temperature changes, the resistance value of a winding 4 of the motor 1 also changes. Even when the motor 1 is driven on the identical output voltage, therefore, output torque may fluctuate. In addition, the temperature characteristics of an element in the circuit portion have influence. The second and third cases correspond to the drive condition of the motor 1 directly fluctuating.

According to the fifth embodiment, as previously described, the correction amount computation unit 25 determines the detected shift lengths α and β and stores them in the storage unit 26 when the control circuit 28 determines that the drive condition or ambient environment of the motor 1 has changed. Specifically, the control circuit 28 determines that a condition has changed when the ambient temperature of the motor 1, the number of revolutions of the motor 1, or a control signal for the motor 1 supplied from ECU fluctuates beyond a predetermined value. Therefore, the correction amount computation unit 25 can compute and update the detected shift lengths α and β when each concrete condition changes and thus follow the change in condition.

It should be noted that the invention is not limited to the embodiments described above and illustrated in the drawings, and can be modified or expanded as described below.

A position sensor, such as Hall Effect ICs, may be used as the position detecting means. In such a case, even when there is variation in the installation position of the Hall Effect ICs, a shift length of a position signal based on the variation can be corrected.

The correction amounts α and β stored in the third and fifth embodiments may be computed and stored in the storage unit at the time of manufacture. In such a case, a computing means only has to be provided on the manufacturing premise and need not be integrated with a motor driving circuit.

With respect to a drive condition or an environmental condition determined at S41 in the fifth embodiment, the above described conditions or other conditions may be set as the basis for the condition change.

Further, the load on the motor need not be a fan mounted in a vehicle and may be a motor driving a different load. And while the above embodiments are described separately, the embodiments may be arbitrarily combined.

What is claimed is:

1. An energization timing determination circuit comprising
a position detecting means for outputting a position signal corresponding to the rotational position of a rotor to determine energization timing used to drive a brushless DC motor;
a detected shift length computing means for carrying out computation based on position signal switching intervals obtained from position signals outputted from the position detecting means in a previous at least one cycle of electrical angle and thereby determining a detected shift length of the position signals; and
a correcting means for correcting energization timing based on the position signals according to the detected shift length,
wherein the detected shift length computing means measures a high-level time and a low-level time within the previous at least one cycle with respect to each position signal outputted from the position detecting means, and computes a duty shift length of the position signal based on the difference value obtained by subtracting the low-level time from the high-level time.

2. The energization timing determination circuit of claim 1, wherein the detected shift length computing means computes the phase shift length based on the relation between the switching intervals of the position signals, the duty shift length, the phase shift length of the position signals, and the average value of the switching intervals of the position signals.

3. An energization timing determination circuit comprising
a position detecting means for outputting a position signal corresponding to the rotational position of a rotor to determine energization timing used to drive a brushless DC motor;
a detected shift length computing means for carrying out computation based on position signal switching intervals obtained from position signals outputted from the position detecting means in a previous at least one cycle of electrical angle and thereby determining a detected shift length of the position signals; and
a correcting means for correcting energization timing based on the position signals according to the detected shift length,
wherein the detected shift length computing means detects an amount of change in the rotational speed of the motor and determines the detected shift length based on the amount of change in rotational speed and a switching time of the position signals, and
wherein the detected shift length computing means cancels a portion arising from acceleration or deceleration of motor rotational speed of the factors accounting for the inequality of switching timing of the position signals by a computation based on an amount of change in the rotational speed of the motor, and thereby computes a variation in the position detection signals due to the remaining detected shift length.

4. The energization timing determination circuit of claim 3, wherein the detected shift length computing means expands or contracts a time axis associated with the computation based on the amount of change in speed, puts switching times of the position signals on the expanded or contracted time axis, determines the detected shift length from switching intervals of the position signals obtained from the switching times, corrects energization timing on the expanded or contracted time axis, transforms the expanded or contracted time axis back into actual time, and thereby determines energization timing in terms of the actual time.

5. An energization timing determination circuit comprising
a position detecting means for outputting a position signal corresponding to the rotational position of a rotor to determine energization timing used to drive a brushless DC motor;
a detected shift length computing means for carrying out computation based on position signal switching intervals obtained from position signals outputted from the position detecting means in a previous at least one cycle of electrical angle and thereby determining a detected shift length of the position signals;
a correcting means for correcting energization timing based on the position signals according to the detected shift length; and
a storing means for storing a detected shift length determined by the detected shift length computing means,
wherein when the detected shift length has been stored in the storing means, the correcting means reads the detected shift length to correct energization timing, and
wherein the detected shift length computing means determines the detected shift length at predetermined intervals and stores the detected shift length in the storing means.

6. An energization timing determination circuit comprising:
a position detecting means for outputting a position signal corresponding to the rotational position of a rotor to determine energization timing used to drive a brushless DC motor;
a detected shift length computing means for carrying out computation based on position signal switching intervals obtained from position signals outputted from the position detecting means in a previous at least one cycle of electrical angle and thereby determining a detected shift length of the position signals;
a correcting means for correcting energization timing based on the position signals according to the detected shift length;
a storing means for storing a detected shift length determined by the detected shift length computing means; and
a condition change determining means for determining that one of a drive condition and an ambient temperature has changed,
wherein when the detected shift length has been stored in the storing means, the correcting means reads the detected shift length to correct energization timing, and
wherein when the condition change determining means determines the change, the detected shift length computing means determines the detected shift length and stores the detected shift length in the storing means.

7. The energization timing determination circuit of claim 6, wherein the condition change determining means includes a temperature detecting means for detecting the ambient temperature, and determines the change in condition when the ambient temperature fluctuates beyond a predetermined value.

8. The energization timing determination circuit of claim 6, wherein the condition change determining means includes a number of revolutions detecting means for detecting the number of revolutions of the motor, and determines the change in condition when the number of revolutions fluctuates beyond a predetermined value.

9. The energization timing determination circuit of claim 6, wherein the condition change determining means is further for monitoring an externally supplied control signal for the motor and for determining the change in condition when the externally supplied control signal fluctuates beyond a predetermined value.

10. An energization timing determination circuit
a position detecting means for outputting a position signal corresponding to the rotational position of a rotor to determine energization timing used to drive a brushless DC motor;
a detected shift length computing means for carrying out computation based on position signal switching intervals obtained from position signals outputted from the position detecting means in a previous at least one cycle of electrical angle and thereby determining a detected shift length of the position signals;
a correcting means for correcting energization timing based on the position signals according to the detected shift length; and
a storing means for storing a detected shift length determined by the detected shift length computing means,
wherein when the detected shift length has been stored in the storing means, the correcting means reads the detected shift length to correct energization timing,
wherein detected shift lengths computed by the detected shift length computing means according to one of a drive condition and an ambient temperature are stored beforehand in the storing means, and
wherein the correcting means reads a detected shift length corresponding to the drive condition or ambient temperature of the motor from the storing means when carrying out correction.

11. A method for determining the energization timing of a motor in which energization timing used to drive a brushless DC motor is determined based on position signals corresponding to the rotational position of a rotor outputted from a position detecting means, the method comprising:
carrying out computation based on position signal switching intervals obtained from position signals outputted from the position detecting means in a previous at least one cycle of electrical angle and thereby determining a detected shift length of the position signal; and
correcting energization timing based on the position signals according to the detected shift length,
wherein a high-level time and a low-level time within the one cycle are measured with respect to each position signal outputted from the position detecting means, and a duty shift length of the position signal is computed based on the difference value obtained by subtracting the low-level time from the high-level time.

12. The method for determining the energization timing of a motor of claim 11, wherein the phase shift length is computed based on the relation between the duty shift length, the switching intervals of the position signals, the phase shift length of the position signals, and the average value of the switching intervals of the position signals.

13. A method for determining the energization timing of a motor in which energization timing used to drive a brushless DC motor is determined based on position signals corresponding to the rotational position of a rotor outputted from a position detecting means, the method comprising:
carrying out computation based on position signal switching intervals obtained from position signals outputted from the position detecting means in a previous at least one cycle of electrical angle and thereby determining a detected shift length of the position signal; and
correcting energization timing based on the position signals according to the detected shift length,
wherein an amount of change in the rotational speed of the motor is detected, and the detected shift length is determined based on the amount of change in rotational speed and a switching time of the position signals, and
wherein of the factors accounting for the inequality of switching timing of the position signals, a portion arising from acceleration or deceleration of motor rotational speed is canceled by computation based on an amount of change in the rotational speed of the motor, and variation in the position detection signals due the remaining detected shift length is thereby computed.

14. The method for determining the energization timing of a motor of claim 13,
wherein a time axis on which computation is based is expanded or contracted based on the amount of change in speed and switching times of the position signals,
wherein the detected shift length is determined from switching intervals of the position signals obtained from the switching times, and energization timing is corrected on the expanded or contracted time axis, and
wherein the time axis is transformed back into the actual time, and energization timing in the actual time is thereby determined.

15. A method for determining the energization timing of a motor in which energization timing used to drive a brushless DC motor is determined based on position signals corresponding to the rotational position of a rotor outputted from a position detecting means, the method comprising:
carrying out computation based on position signal switching intervals obtained from position signals outputted from the position detecting means in a previous at least one cycle of electrical angle and thereby determining a detected shift length of the position signal; and
correcting energization timing based on the position signals according to the detected shift length,
wherein a determined detected shift length is stored in a storing means,
wherein when the detected shift length has been stored in the storing means, that detected shift length is read out to correct energization timing, and
wherein the detected shift length is determined at predetermined intervals and stored in the storing means.

16. A method for determining the energization timing of a motor in which energization timing used to drive a brushless DC motor is determined based on position signals corresponding to the rotational position of a rotor outputted from a position detecting means, the method comprising:
carrying out computation based on position signal switching intervals obtained from position signals outputted from the position detecting means in a previous at least one cycle of electrical angle and thereby determining a detected shift length of the position signal; and
correcting energization timing based on the position signals according to the detected shift length,
wherein a determined detected shift length is stored in a storing means,
wherein when the detected shift length has been stored in the storing means, that detected shift length is read out to correct energization timing, and
wherein when it is determined that one of a drive condition and an ambient temperature has changed, the detected shift length is determined and stored in the storing means.

17. The method for determining the energization timing of a motor of claim 16,
wherein when the ambient temperature fluctuates beyond a predetermined value, the change in condition is determined.

18. The method for determining the energization timing of a motor of claim 16,
wherein when the number of revolutions of the motor fluctuates beyond a predetermined value, the change in condition is determined.

19. The method for determining the energization timing of a motor of claim 16,
wherein when a control signal for the motor externally supplied fluctuates beyond a predetermined value, the change in condition is determined.

20. A method for determining the energization timing of a motor in which energization timing used to drive a brushless DC motor is determined based on position signals corresponding to the rotational position of a rotor outputted from a position detecting means, the method comprising:
carrying out computation based on position signal switching intervals obtained from position signals outputted from the position detecting means in a previous at least one cycle of electrical angle and thereby determining a detected shift length of the position signal; and
correcting energization timing based on the position signals according to the detected shift length,
wherein a determined detected shift length is stored in a storing means,
wherein when the detected shift length has been stored in the storing means, that detected shift length is read out to correct energization timing,
wherein detected shift lengths computed according to the one of the drive condition and the ambient temperature are stored beforehand in the storing means, and
wherein a detected shift length correcting the one of the drive condition and the ambient temperature of the motor is read from the storing means when correction is carried out.

* * * * *